United States Patent
Lei et al.

(10) Patent No.: US 11,159,372 B2
(45) Date of Patent: Oct. 26, 2021

(54) METHOD AND APPARATUS FOR RESTORING NETWORK DEVICE TO FACTORY DEFAULTS, AND NETWORK DEVICE

(71) Applicant: Huawei Technologies Co., Ltd., Guangdong (CN)

(72) Inventors: Xin Lei, Shenzhen (CN); Yun Zhou, Wuhan (CN); Xiao Luo, Dongguan (CN); Peijian Kang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/283,585

(22) Filed: Feb. 22, 2019

(65) Prior Publication Data

US 2019/0190779 A1    Jun. 20, 2019

Related U.S. Application Data

(63) Continuation of application No. PCT/CN2017/089468, filed on Jun. 22, 2017.

(30) Foreign Application Priority Data

Aug. 24, 2016    (CN) .......................... 201610716564.4

(51) Int. Cl.
*G06F 15/177*    (2006.01)
*H04L 12/24*    (2006.01)
(Continued)

(52) U.S. Cl.
CPC ............ *H04L 41/0816* (2013.01); *G06F 1/24* (2013.01); *H04L 29/08* (2013.01); *H04L 41/0863* (2013.01)

(58) Field of Classification Search
None
See application file for complete search history.

(56) References Cited

U.S. PATENT DOCUMENTS 6,336,161 B1 *    1/2002   Watts ........................ G06F 1/30
                                                                711/103
8,145,894 B1 *    3/2012   Casselman .......... G06F 15/7871
                                                                713/1

(Continued)

FOREIGN PATENT DOCUMENTS

CN        102223291 A      10/2011
CN        103281197 A       9/2013
(Continued)

OTHER PUBLICATIONS

RFC6244 P. Shafer,"An Architecture for Network Management Using NETCONF and YANG",Internet Engineering Task Force (IETF) ,dated Jun. 2011,total 30 pages.
(Continued)

*Primary Examiner* — Phuoc H Nguyen
(74) *Attorney, Agent, or Firm* — Womble Bond Dickinson (US) LLP

(57) ABSTRACT

Embodiments of the present disclosure disclose a method and an apparatus for restoring a network device to factory defaults, and a network device, and relate to the field of configuration management technologies. A NETCONF server determines that the network device needs to be restored to the factory defaults; the NETCONF server replaces data in a startup configuration datastore and a running configuration datastore in the NETCONF server with factory defaults data in a factory defaults datastore, where the factory defaults datastore is dedicated to storing the factory defaults data of the network device. The NETCONF server delivers the data in the running configuration datastore after replacement to a plurality of service modules.

(Continued)

Then, the plurality of service modules performs a validation operation based on the data delivered by the NETCONF server.

14 Claims, 10 Drawing Sheets

(51) Int. Cl.
*H04L 29/08* (2006.01)
*G06F 1/24* (2006.01)

(56) References Cited

U.S. PATENT DOCUMENTS

| | | | |
|---|---|---|---|
| 8,335,171 | B1 | 12/2012 | Purkayastha et al. |
| 9,021,010 | B1 | 4/2015 | Das et al. |
| 2007/0255934 | A1* | 11/2007 | Dennis ............... G06F 11/1417 713/1 |
| 2012/0150816 | A1* | 6/2012 | Pafumi ............... G06F 11/1469 707/679 |
| 2014/0078930 | A1* | 3/2014 | Bevemyr ............ H04L 41/0226 370/254 |
| 2014/0278244 | A1* | 9/2014 | Humphrey ............ G01N 21/01 702/182 |
| 2016/0103692 | A1 | 4/2016 | Guntaka et al. |
| 2016/0373300 | A1 | 12/2016 | Liu |
| 2018/0026834 | A1* | 1/2018 | Dec ...................... H04L 41/145 709/221 |
| 2018/0295019 | A1* | 10/2018 | Magnusson ......... H04L 41/0886 |

FOREIGN PATENT DOCUMENTS

| | | |
|---|---|---|
| CN | 103701653 A | 4/2014 |
| CN | 104883266 A | 9/2015 |
| WO | 2012/048873 A1 | 4/2012 |

OTHER PUBLICATIONS

RFC6243 A. Bierman et al.,"With-defaults Capability for NETCONF",Internet Engineering Task Force (IETF) ,dated Jun. 2011,total 26 pages.
RFC6242 M. Wasserman,"Using the NETCONF Protocol over Secure Shell (SSH)",Internet Engineering Task Force (IETF) ,dated Jun. 2011,total 11 pages.
RFC6241 R. Enns, Ed. et al.,"Network Configuration Protocol (NETCONF)",Internet Engineering Task Force (IETF) ,dated Jun. 2011,total 113 pages.
RFC6022 M. Scott,"YANG Module for NETCONF Monitoring",Internet Engineering Task Force (IETF) ,dated Oct. 2010,total 28 pages.
RFC6021 J. Schoenwaelder, Ed.,"Common YANG Data Types",Internet Engineering Task Force (IETF) ,dated Oct. 2010,total 26 pages.
RFC6020 M. Bjorklund, Ed.,"YANG—A Data Modeling Language for the Network Configuration Protocol (NETCONF)",Network Working Group,dated Oct. 2010,total 173 pages.
RFC5717 B. Lengyel et al.,"Partial Lock Remote Procedure Call (RPC) for NETCONF",Network Working Group,dated Dec. 2009,total 23 pages.
RFC5539 M. Badra,"NETCONF over Transport Layer Security (TLS)",Network Working Group,dated May 2009,total 7 pages.
RFC5277 S. Chisholm et al.,"NETCONF Event Notifications",Network Working Group,dated Jul. 2008,total 35 pages.
RFC4744 E. Lear et al.,"Using the NETCONF Protocol over the Blocks Extensible Exchange Protocol (BEEP)",Network Working Group,dated Dec. 2006,total 10 pages.
RFC4743 T. Goddard,"Using NETCONF over the Simple Object Access Protocol (SOAP)",Network Working Group,dated Dec. 2006,total 20 pages.
RFC4742 M. Wasserman et al.,"Using the NETCONF Configuration Protocol over Secure SHell (SSH)",Network Working Group,dated ,total 10 pages.
RFC4741 R. Enns, Ed.,"NETCONF Configuration Protocol",Network Working Group,dated Dec. 2006 ,total 95 pages.

\* cited by examiner

METHOD AND APPARATUS FOR RESTORING NETWORK DEVICE TO FACTORY DEFAULTS, AND NETWORK DEVICE

CROSS-REFERENCE TO RELATED APPLICATIONS

This application is a continuation of International Application No. PCT/CN2017/089468, filed on Jun. 22, 2017, which claims priority to Chinese Patent Application No. 201610716564.4, filed on Aug. 24, 2016. The disclosures of the aforementioned applications are hereby incorporated by reference in their entireties.

TECHNICAL FIELD

The present disclosure relates to the field of configuration management technologies, and in particular, to a method and an apparatus for restoring a network device to factory defaults, and a network device.

BACKGROUND

Usually, most devices have a factory defaults restoring function, so that when a function of a device is unstable or a user forgets a login password of a device, the device returns to normal after being restored to factory defaults.

Currently, in a method for restoring a network device to factory defaults according to a Network Configuration Protocol (NETCONF), each service module in the network device stores its factory defaults data, and a Yang model of each service module defines a remote procedure call (RPC) command for restoring to factory defaults. If the network device runs abnormally due to configuration when the device is running, a user may trigger a NETCONF client to deliver, based on the locally stored RPC command in the Yang model of the service module of the network device, a corresponding RPC command to the service module in the network device. Before the network device restarts, each service module replaces data in a startup configuration datastore of a NETCONF server with the factory defaults data of the service module by using a database read/write interface of the NETCONF server in the network device. After the network device restarts, the NETCONF server replaces data in a running configuration datastore with the data in the startup configuration datastore, and then the NETCONF server delivers the data in the running configuration datastore to the corresponding service module. In this way, each service module makes the factory defaults data be valid, so that the network device has the factory defaults.

Because a plurality of service modules in a network device store respective factory defaults data, each service module needs to register its factory defaults processing function. This is disadvantageous to third-party extension and increases development difficulty. In addition, this provides poor maintainability because a NETCONF client needs to deliver, to different service modules by using a NETCONF server, different RPC commands for restoring to factory defaults.

SUMMARY

Embodiments of the present disclosure provide a method and an apparatus for restoring a network device to factory defaults, and a network device, to resolve a prior-art problem that a method for restoring a network device to factory defaults is disadvantageous to third-party extension, increases development difficulty, and provides poor maintainability.

To achieve the foregoing objective, the following technical solutions are used in the embodiments of the present disclosure.

According to a first aspect, a method for restoring a network device to factory defaults is provided, where the network device includes a NETCONF server and a plurality of service modules, and the method includes: determining, by the NETCONF server, that the network device needs to be restored to the factory defaults; replacing, by the NETCONF server, data in a startup configuration datastore and a running configuration datastore in the NETCONF server with factory defaults data in a factory defaults datastore, where the factory defaults datastore is dedicated to storing the factory defaults data of the network device; delivering, by the NETCONF server, the data in the running configuration datastore after replacement to the plurality of service modules; and performing, by the plurality of service modules, a validation operation based on the data delivered by the NETCONF server.

According to the method provided in the first aspect, the factory defaults datastore is dedicated to storing the factory defaults data of the network device. This avoids that each service module stores its factory defaults data. The NETCONF server itself can restore the network device to the factory defaults, and therefore each service module does not need to register its factory defaults processing function. This is beneficial to third-party extension. In addition, a NETCONF client does not need to deliver a command for restoring to factory defaults to each service module in the network device by using the NETCONF server. This is convenient for maintenance.

With reference to the first aspect, in a first possible implementation, the determining, by the NETCONF server, that the network device needs to be restored to the factory defaults includes: when the NETCONF server determines that the network device starts for the first time or receives a command, for restoring to factory defaults, sent by the NETCONF client, determining, by the NETCONF server, that the network device needs to be restored to the factory defaults.

With reference to the first possible implementation of the first aspect, in a second possible implementation, when the network device starts for the first time, the replacing, by the NETCONF server, data in a startup configuration datastore and a running configuration datastore in the NETCONF server with factory defaults data in a factory defaults datastore includes: replacing, by the NETCONF server, the data in the startup configuration datastore with the factory defaults data; and replacing, by the NETCONF server, the data in the running configuration datastore with the data in the startup configuration datastore after replacement.

With reference to the first possible implementation of the first aspect, in a third possible implementation, when the NETCONF server receives the command, for restoring to factory defaults, sent by the NETCONF client, the replacing, by the NETCONF server, data in a startup configuration datastore and a running configuration datastore in the NETCONF server with factory defaults data in a factory defaults datastore includes: replacing, by the NETCONF server, the data in the startup configuration datastore with the factory defaults data; and after the network device restarts, replacing, by the NETCONF server, the data in the running configuration datastore with the data in the startup configuration datastore after replacement.

With reference to the first possible implementation of the first aspect, in a fourth possible implementation, when the NETCONF server receives the command, for restoring to factory defaults, sent by the NETCONF client, the replacing, by the NETCONF server, data in a startup configuration datastore and a running configuration datastore in the NETCONF server with factory defaults data in a factory defaults datastore includes: replacing, by the NETCONF server, the data in both the startup configuration datastore and the running configuration datastore in the NETCONF server with the factory defaults data in the factory defaults datastore; and the delivering, by the NETCONF server, the data in the running configuration datastore after replacement to the plurality of service modules includes: delivering, by the NETCONF server, different data between the running configuration datastore after replacement and the running configuration datastore before the replacement to the plurality of service modules.

With reference to any one of the first aspect or the first possible implementation to the fourth possible implementation of the first aspect, in a fifth possible implementation, before the determining, by the NETCONF server, that the network device needs to be restored to the factory defaults, the method further includes: establishing, by the NETCONF server, a connection-oriented transport protocol session with the NETCONF client; and sending, by the NETCONF server, a capability set of the NETCONF server to the NETCONF client, and receiving a capability set of the NETCONF client sent by the NETCONF client, where the capability set of the NETCONF server includes a factory defaults restoring capability identifier of the NETCONF server, and the factory defaults restoring capability identifier is used to indicate that the NETCONF server has the factory defaults restoring capability.

According to this possible implementation, the NETCONF client can learn that the NETCONF server has the factory defaults restoring capability.

With reference to any one of the first aspect or the first possible implementation to the fifth possible implementation of the first aspect, in a sixth possible implementation, the method further includes: receiving, by the NETCONF server, a factory defaults storing command sent by the NETCONF client; and replacing, by the NETCONF server, the data in the factory defaults datastore with target data, where the target data is preset data, data in a preset configuration datastore, or data in a preset file.

With reference to the sixth possible implementation of the first aspect, in a seventh possible implementation, the command for restoring to factory defaults is a remote procedure call RPC command that is added to a Yang model of the NETCONF and that is used to restore the network device to the factory defaults, and the factory defaults storing command is an RPC command that is added to the Yang model of the NETCONF and that is used to store the factory defaults of the network device.

According to a second aspect, a method for restoring a network device to factory defaults is provided, and the method includes: receiving, by a NETCONF client, an instruction from a user for restoring the network device to the factory defaults; and sending, by the NETCONF client, a command for restoring to factory defaults to a NETCONF server in the network device according to a remote procedure call RPC command added to a Yang model of the NETCONF, so that the NETCONF server replaces data in a startup configuration datastore and a running configuration datastore in the NETCONF server with factory defaults data in a factory defaults datastore, and delivers the data in the running configuration datastore to a plurality of service modules, so that the plurality of service modules perform a validation operation based on the data delivered by the NETCONF server, where the factory defaults datastore is dedicated to storing the factory defaults data of the network device.

According to the method provided in the second aspect, the NETCONF client sends the command for restoring to factory defaults to the NETCONF server, so that the NETCONF server restores the network device to the factory defaults based on a capability of the NETCONF server, and therefore each service module does not need to register its factory defaults processing function. This is beneficial to third-party extension. In addition, the NETCONF client does not need to deliver the command for restoring to factory defaults to each service module in the network device by using the NETCONF server. This is convenient for maintenance.

With reference to the second aspect, in a first possible implementation, before the sending, by the NETCONF client, a command for restoring to factory defaults to a NETCONF server in the network device according to an RPC command added to a Yang model of the NETCONF, the method further includes: determining, by the NETCONF client, that the NETCONF server has a factory defaults restoring capability.

With reference to the first possible implementation of the second aspect, in a second possible implementation, before the determining, by the NETCONF client, that the NETCONF server has a factory defaults restoring capability, the method further includes: receiving, by the NETCONF client, a capability set of the NETCONF server sent by the NETCONF server, and sending a capability set of the NETCONF client to the NETCONF server, where the capability set of the NETCONF server includes a factory defaults restoring capability identifier of the NETCONF server, and the factory defaults restoring capability identifier is used to indicate that the NETCONF server has the factory defaults restoring capability; and the determining, by the NETCONF client, that the NETCONF server has a factory defaults restoring capability includes: determining, by the NETCONF client based on the factory defaults restoring capability identifier in the capability set of the NETCONF server, that the NETCONF server has the factory defaults restoring capability.

With reference to the second aspect, or the first possible implementation or the second possible implementation of the second aspect, in a third possible implementation, the method further includes: receiving, by the NETCONF client, an instruction from the user for storing the factory defaults of the network device; and sending, by the NETCONF client, a factory defaults storing command to the NETCONF server in the network device according to an RPC command that is added to the Yang model of the NETCONF and that is used to store the factory defaults of the network device, so that the NETCONF server replaces the data in the factory defaults datastore with target data, where the target data is preset data, data in a preset configuration datastore, or data in a preset file.

According to a third aspect, a network device is provided, and the network device includes: a determining unit, configured to determine that the network device needs to be restored to factory defaults; a replacement unit, configured to replace data in a startup configuration datastore and a running configuration datastore in the network device with factory defaults data in a factory defaults datastore, where the factory defaults datastore is dedicated to storing the factory defaults data of the network device; a delivery unit, configured to deliver the data in the running configuration datastore after replacement to an execution unit; and the execution unit, configured to perform a validation operation based on the data delivered by the delivery unit.

The units in the network device are configured to implement the method in the first aspect. Therefore, for beneficial effects of the network device, refer to the beneficial effects of the foregoing method. Details are not described herein again.

According to a fourth aspect, an apparatus for restoring a network device to factory defaults is provided, and the apparatus includes: a receiving unit, configured to receive an instruction from a user for restoring the network device to the factory defaults; and a sending unit, configured to send a command for restoring to factory defaults to the network device according to a remote procedure call RPC command added to a Yang model of the NETCONF, so that the network device replaces data in a startup configuration datastore and a running configuration datastore in the network device with factory defaults data in a factory defaults datastore, and performs a validation operation based on the data in the running configuration datastore, where the factory defaults datastore is dedicated to storing the factory defaults data of the network device.

The units in the apparatus are configured to implement the method in the second aspect. Therefore, for beneficial effects of the apparatus, refer to the beneficial effects of the foregoing method. Details are not described herein again.

According to a fifth aspect, a network device is provided, and the network device includes a memory and a processor, where the memory is configured to store a set of code, and the processor is configured to perform the following actions based on the set of code: determining that the network device needs to be restored to factory defaults; replacing data in a startup configuration datastore and a running configuration datastore in the network device with factory defaults data in a factory defaults datastore, where the factory defaults datastore is dedicated to storing the factory defaults data of the network device; and performing a validation operation based on the data in the running configuration datastore after replacement.

The components in the network device are configured to implement the method in the first aspect. Therefore, for beneficial effects of the network device, refer to the beneficial effects of the foregoing method. Details are not described herein again.

According to a sixth aspect, an apparatus for restoring a network device to factory defaults is provided, and the apparatus includes a transmitter, a receiver, and a processor, where the processor is configured to receive, by using the receiver, an instruction from a user for restoring the network device to the factory defaults; and the processor is configured to send, by using the transmitter, a command for restoring to factory defaults to the network device according to a remote procedure call RPC command added to a Yang model of the NETCONF, so that the network device replaces data in a startup configuration datastore and a running configuration datastore in the network device with factory defaults data in a factory defaults datastore, and performs a validation operation based on the data in the running configuration datastore, where the factory defaults datastore is dedicated to storing the factory defaults data of the network device.

The components in the apparatus are configured to implement the method in the second aspect. Therefore, for beneficial effects of the apparatus, refer to the beneficial effects of the foregoing method. Details are not described herein again.

BRIEF DESCRIPTION OF THE DRAWINGS

To describe the technical solutions in the embodiments of the present disclosure or in the prior art more clearly, the following briefly describes the accompanying drawings required for describing the embodiments or the prior art.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

NETCONF is a new network configuration and management protocol. To adapt to a current user requirements such as an ever-expanding network scale, increased network complexity, and reliability improvement, for issues on a structure and a function of the Simple Network Management Protocol (SNMP), a new mechanism for managing configuration information and status information of a network device (such as a switch or a router) is proposed in the NETCONF.

Figure 1:
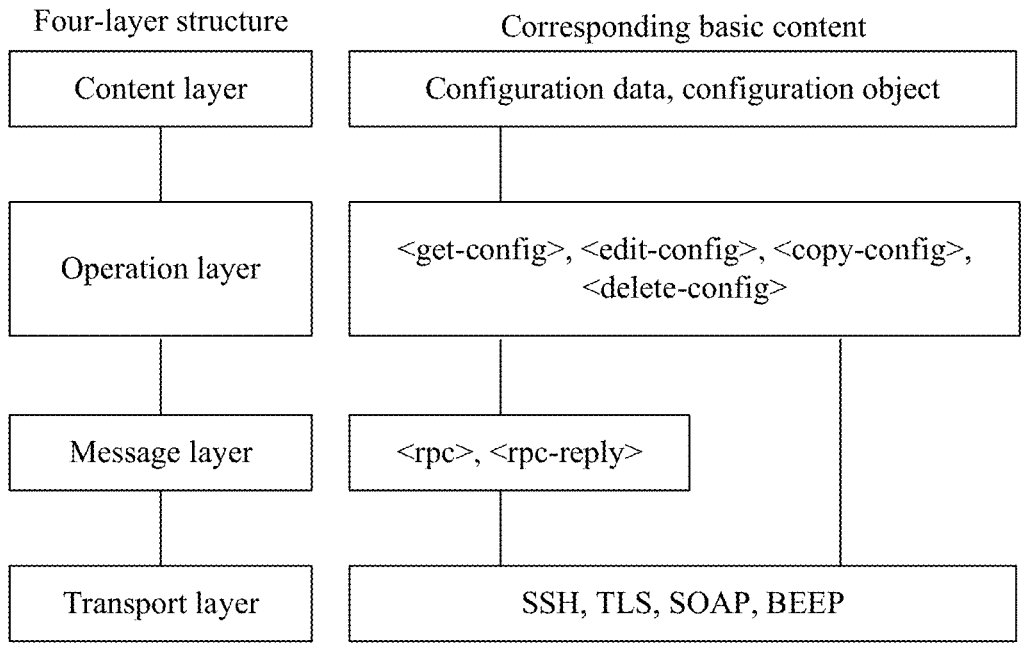
FIG. 1 is a schematic hierarchical diagram of a NETCONF in the prior art.

Message transmission of the NETCONF is divided into four layers, including a transport layer, a message layer, an operation layer, and a content layer, as shown in FIG. 1.

The transport layer is mainly used to establish a communication path between a network device and a NETCONF client. A transport layer protocol may be specifically the Secure Shell (SSH) protocol, the Transport Layer Security (TLS) protocol, the Simple Object Access Protocol (SOAP), the Blocks Extensible Exchange Protocol (BEEP), or the like.

The message layer represents an RPC-based communication model. Therefore, the message layer may also be referred to as an RPC layer. The message layer encapsulates an operation request message by using an <rpc> element and sends a request to a network device by using a secure connection-oriented session. The network device encapsulates a response message of the operation request by using an <rpc-reply> element, and sends the response message to a requester.

The operation layer defines a set of basic operation elements. These operation elements are most basic RPC operation elements, specifically including <get-config> (query), <edit-config> (modification), <copy-config> (overwrite), <delete-config> (clear), and the like. <edit-config> is limited to operating a running configuration datastore (running configuration datastore) and a candidate (candidate) configuration datastore (candidate configuration datastore). <delete-config> is limited to operating a startup configuration datastore (startup configuration datastore).

The NETCONF defines three configuration datastores for storing configuration data. The three configuration datastores are the startup configuration datastore, the running configuration datastore, and the candidate configuration datastore. The startup configuration datastore is used to store startup configuration of a network device. The startup configuration is configuration, used when a system of the network device starts next time, of the network device. The startup configuration may be different from running configuration. The startup configuration datastore is a datastore that takes effect by default when the system of the network device starts, and is loaded by the network device when the system starts. The running configuration datastore is used to store running configuration of a network device. The running configuration is configuration of the network device running in an active state currently, and the active state is exactly the same as a running state. Current configuration can be updated to the startup configuration datastore by copying data in the running configuration datastore to the startup configuration datastore, and the configuration data is used as configuration data to be loaded when the system starts next time. The candidate configuration datastore is used to store optional configuration of a network device. The optional configuration is candidate configuration that has not taken effect. The NETCONF client can use an RPC command that may be specifically a commit command, to apply the optional configuration to the network device, so that the optional configuration can become current running configuration.

The content layer describes configuration data used in network management, specifically including configuration data and a configuration object. The content layer basically depends on a device vendor.

Figure 2:
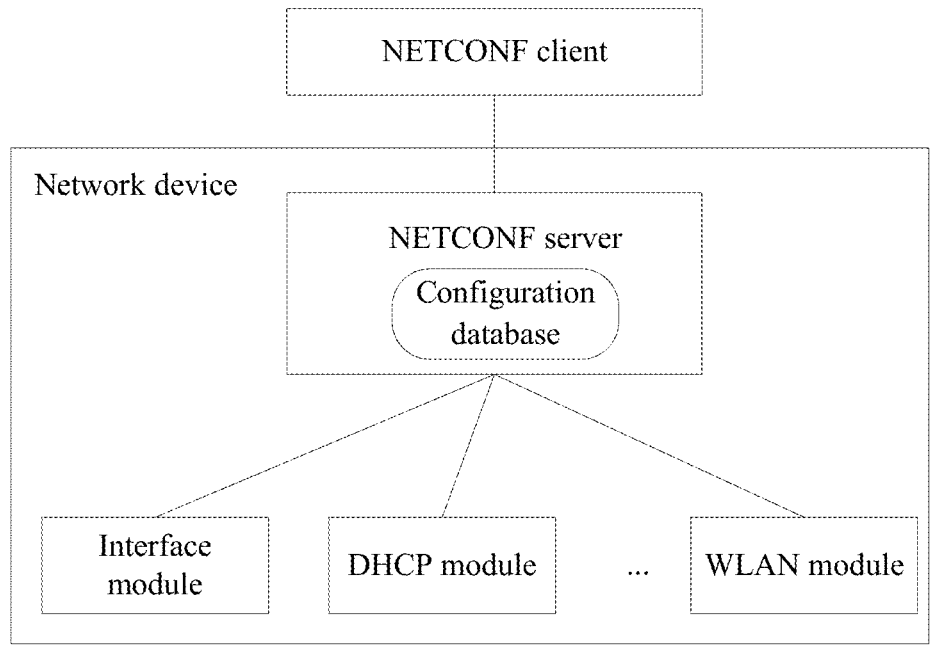
FIG. 2 is a schematic architecture diagram of an automated configuration system of a NETCONF according to an embodiment of the present disclosure.

An architecture used by an automated configuration system of the NETCONF is shown in FIG. 2. The architecture includes a NETCONF client and a network device. The network device includes a NETCONF server and a plurality of service modules. The service modules may specifically include an interface module, a Dynamic Host Configuration Protocol (DHCP) module, a wireless local area network (WLAN) module, and the like. The NETCONF client is connected to the NETCONF server, and the NETCONF server is connected to the plurality of service modules. The NETCONF server further includes a configuration database. The configuration database includes a startup configuration datastore, a running configuration datastore, and a candidate configuration datastore.

A session is established between the NETCONF client and the NETCONF server by using a connection-oriented transport protocol (such as the SSH, TLS, SOAP, or BEEP). Content communicated between the NETCONF client and the NETCONF server is an RPC message in a bi-directional Extensible Markup Language (XML) format defined by the NETCONF, including a request message sent from the NETCONF client to the NETCONF server, and a response message returned by the NETCONF server to the NETCONF client. In this way, the NETCONF client can obtain and modify configuration data of the NETCONF server. A message format of the RPC message is defined by a Yang model, and the Yang model may define the message format and a format of configuration data included in the message. To resolve a prior-art problem, the NETCONF is improved in the embodiments of the present disclosure, and the improvement specifically includes: A factory defaults datastore is added to the NETCONF, and the factory defaults datastore is used to store factory defaults data of the network device. For example, the datastore may be named factory defaults datastore, and this naming is merely an example. A name of the factory defaults datastore may also be another name. A factory defaults restoring capability identifier is added to a capability set of the NETCONF server, to indicate that the NETCONF implemented by the NETCONF server supports a factory defaults restoring function. For example, the factory defaults restoring capability identifier may be specifically: urn:ietf:params:netconf:capability:factory:1.0. An RPC command for restoring to factory defaults and an RPC command for storing factory defaults are added to the Yang model of the NETCONF.

Formats of the RPC commands and formats of configuration data included in the RPC commands are all defined by the Yang model. For example, a name of the RPC command for restoring to factory defaults may be <factory-restore>, and a name of the RPC command for storing factory defaults may be <factory-store>.

Figure 3:
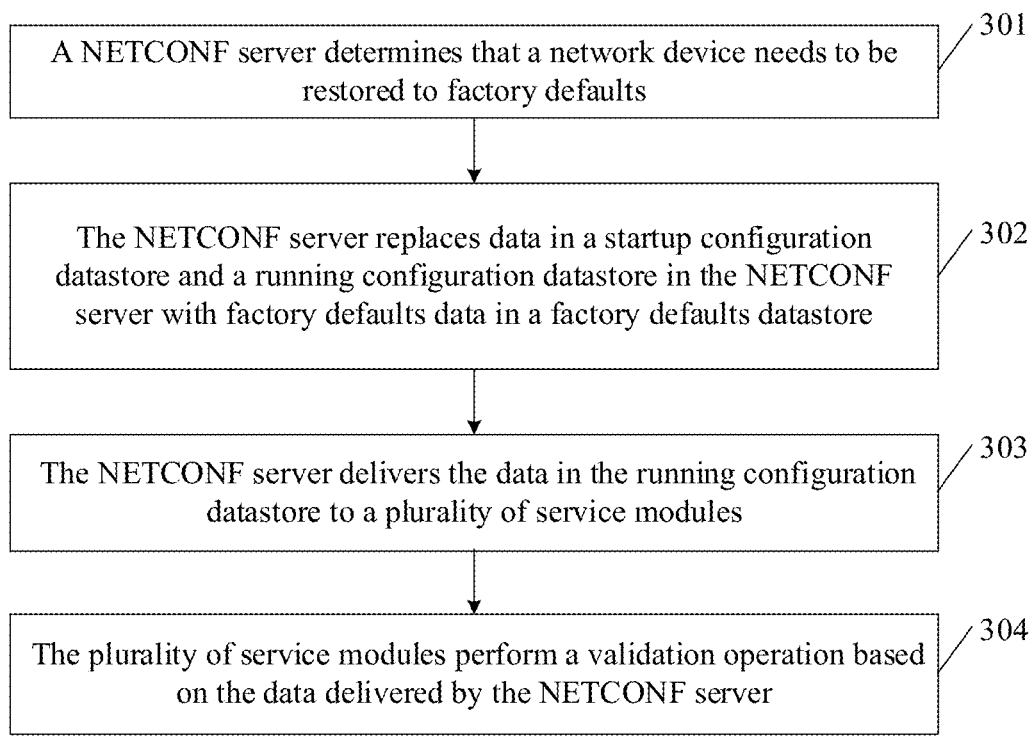
FIG. 3 is a flowchart of a method for restoring a network device to factory defaults according to an embodiment of the present disclosure.

An embodiment of the present disclosure provides a method for restoring a network device to factory defaults. The network device includes a NETCONF server and a plurality of service modules. As shown in FIG. 3, the method includes the following steps.

301: The NETCONF server determines that the network device needs to be restored to the factory defaults.

Optionally, step 301 may be specifically implemented as: When the NETCONF server determines that the network device starts for the first time or receives a command, for restoring to factory defaults, sent by the NETCONF client, the NETCONF server determines that the network device needs to be restored to the factory defaults.

The NETCONF client may be software running on other computers or server hardware apparatuses outside the network device.

Specifically, the NETCONF server may determine, during a startup process of the network device, whether a startup configuration datastore is empty, to determine whether the network device starts for the first time. Specifically, when the startup configuration datastore is empty, the network device starts for the first time. In addition, the NETCONF server may further determine, based on a preset first-time startup identifier, that the network device starts for the first time. This is not specifically limited in this embodiment of the present disclosure.

302: The NETCONF server replaces data in a startup configuration datastore and a running configuration datastore in the NETCONF server with factory defaults data in a factory defaults datastore.

The factory defaults datastore is dedicated to storing the factory defaults data of the network device. The factory defaults datastore is a datastore added to the existing NETCONF. Only when the network device starts for the first time or the NETCONF server receives a command for restoring to factory defaults, the NETCONF server replaces the data in the startup configuration datastore and the running configuration datastore with the factory defaults data in the factory defaults datastore.

303: The NETCONF server delivers the data in the running configuration datastore to the plurality of service modules.

It should be noted that the network device includes the plurality of service modules such as an interface module, a DHCP module, and a WLAN module. Different service modules are used for processing different data. Therefore, during data delivery, the NETCONF server delivers, to a different service module, data to be processed by the service module.

304: The plurality of service modules perform a validation operation based on the data delivered by the NETCONF server.

After step 304 is performed, the network device is restored to the factory defaults.

According to the method provided in this embodiment of the present disclosure, the factory defaults datastore is dedicated to storing the factory defaults data of the network device. This avoids that each service module stores its factory defaults data. The NETCONF server itself can restore the network device to the factory defaults, and therefore each service module does not need to register its factory defaults processing function. This is beneficial to third-party extension. In addition, the NETCONF client does not need to deliver the command for restoring to factory defaults to each service module in the network device by using the NETCONF server. This is convenient for maintenance.

The method shown in FIG. 3 is further described by using different application scenarios. For the following explanations based on embodiments described in FIG. 4, FIG. 5, and FIG. 6 and related to the embodiment described in FIG. 3, refer to the embodiment described in FIG. 3.

Figure 4:
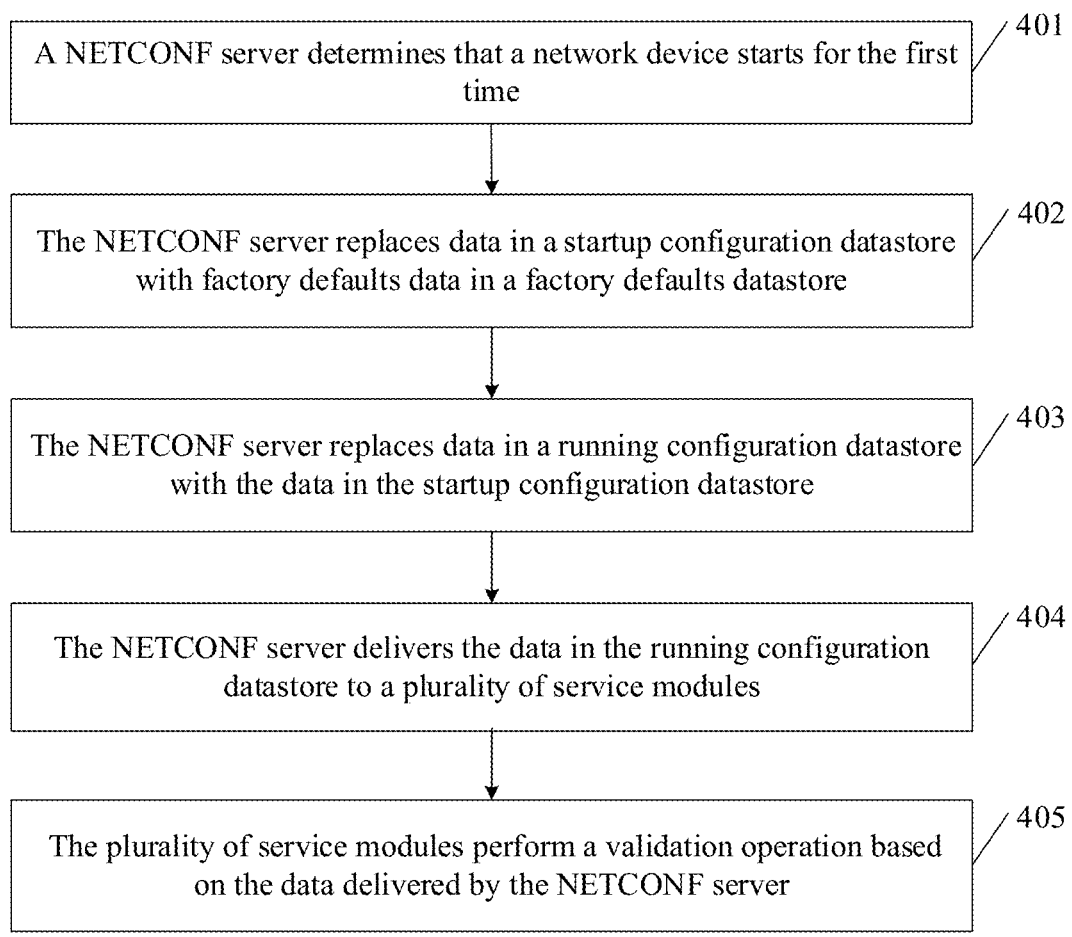
FIG. 4 is a flowchart of another method for restoring a network device to factory defaults according to an embodiment of the present disclosure.

Scenario 1: The network device starts for the first time. In this scenario, as shown in FIG. 4, the foregoing method includes the following steps.

401: The NETCONF server determines that the network device starts for the first time.

For a specific implementation of step 401, refer to the foregoing description. Details are not described herein again.

402: The NETCONF server replaces the data in the startup configuration datastore with the factory defaults data in the factory defaults datastore.

403: The NETCONF server replaces the data in the running configuration datastore with the data in the startup configuration datastore.

404: This step is the same as step 303.

405: This step is the same as step 304.

Figure 5:
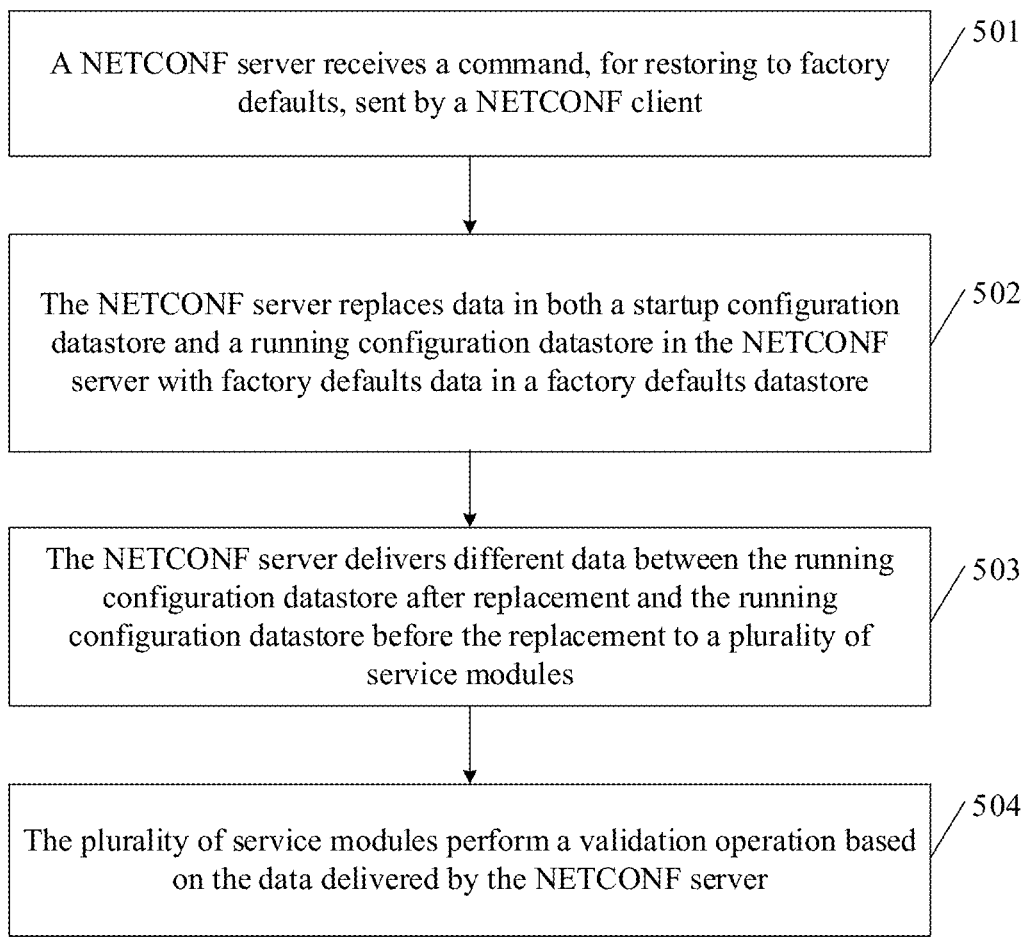
FIG. 5 is a flowchart of another method for restoring a network device to factory defaults according to an embodiment of the present disclosure.

Scenario 2: The network device receives the command, for restoring to factory defaults, sent by the NETCONF client. In this scenario, the foregoing method may be implemented by using a method shown in FIG. 5 or FIG. 6. Specifically, as shown in FIG. 5, the foregoing method includes the following steps.

501: The NETCONF server receives a command, for restoring to factory defaults, sent by the NETCONF client.

502: The NETCONF server replaces the data in both the startup configuration datastore and the running configuration datastore in the NETCONF server with the factory defaults data in the factory defaults datastore.

503: The NETCONF server delivers different data between the running configuration datastore after replacement and the running configuration datastore before the replacement to the plurality of service modules.

504: This step is the same as step 304.

Figure 6:
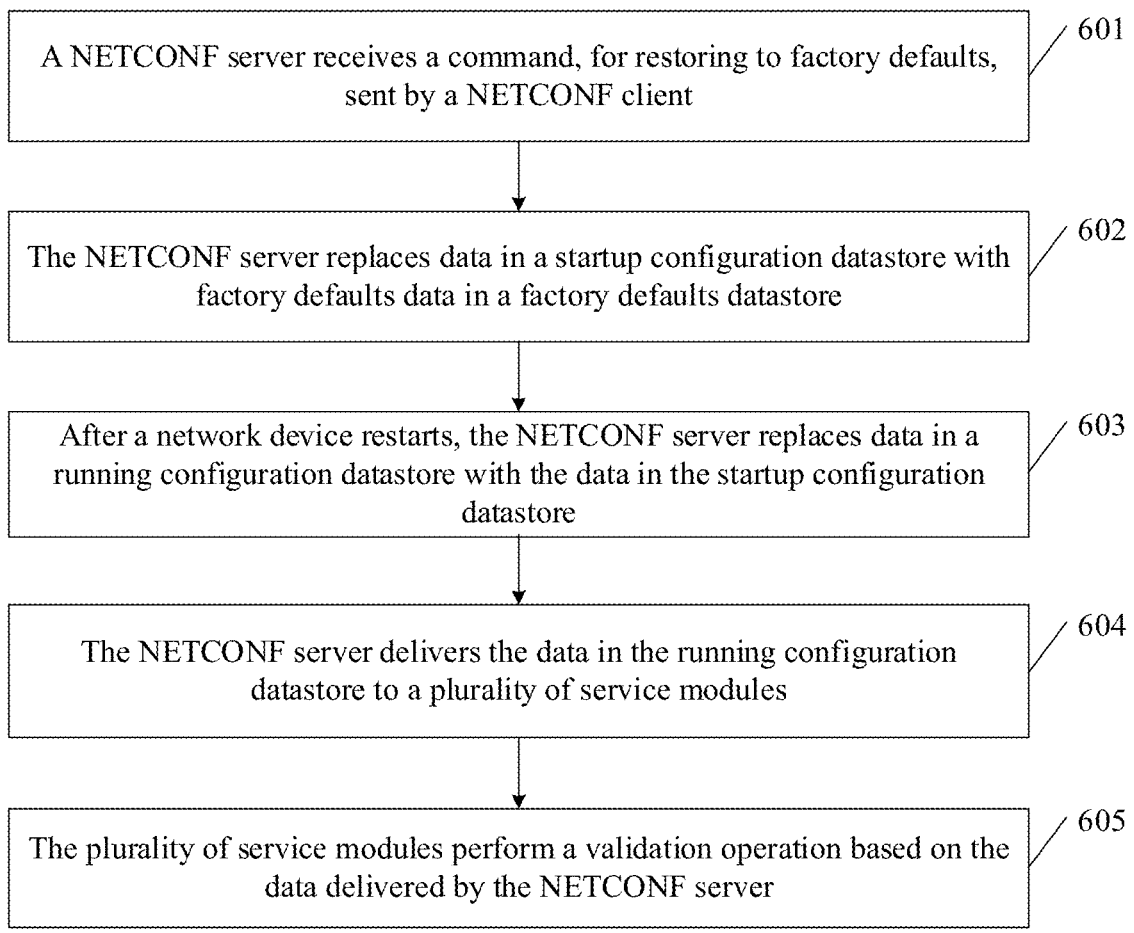
FIG. 6 is a flowchart of another method for restoring a network device to factory defaults according to an embodiment of the present disclosure.

In scenario 2, as shown in FIG. 6, the foregoing method includes the following steps.

601: The NETCONF server receives a command, for restoring to factory defaults, sent by the NETCONF client.

The command for restoring to factory defaults may be an RPC command, for restoring to factory defaults, added to a Yang model of the NETCONF.

602: The NETCONF server replaces the data in the startup configuration datastore with the factory defaults data in the factory defaults datastore.

603: After the network device restarts, the NETCONF server replaces the data in the running configuration datastore with the data in the startup configuration datastore.

604: This step is the same as step 303.

605: This step is the same as step 304.

During specific implementation of the foregoing method, after receiving the command for restoring to factory defaults, the NETCONF server may restore the network device to the factory defaults based on settings in the network device by using the method shown in FIG. 5 or FIG. 6, or may indicate, in the command for restoring to factory defaults, whether the network device needs to restart. If it indicates that the network device needs to restart, the method shown in FIG. 6 is used to restore the network device to the factory defaults. If it indicates that the network device does not need to restart, the method shown in FIG. 5 is used to restore the network device to the factory defaults.

In another implementable manner, after the NETCONF server receives the command for restoring to factory defaults, if the NETCONF server uses a manner of presetting a first-time startup identifier, the NETCONF server may alternatively restore the network device to the factory defaults by using steps 402 to 405.

Figure 7:
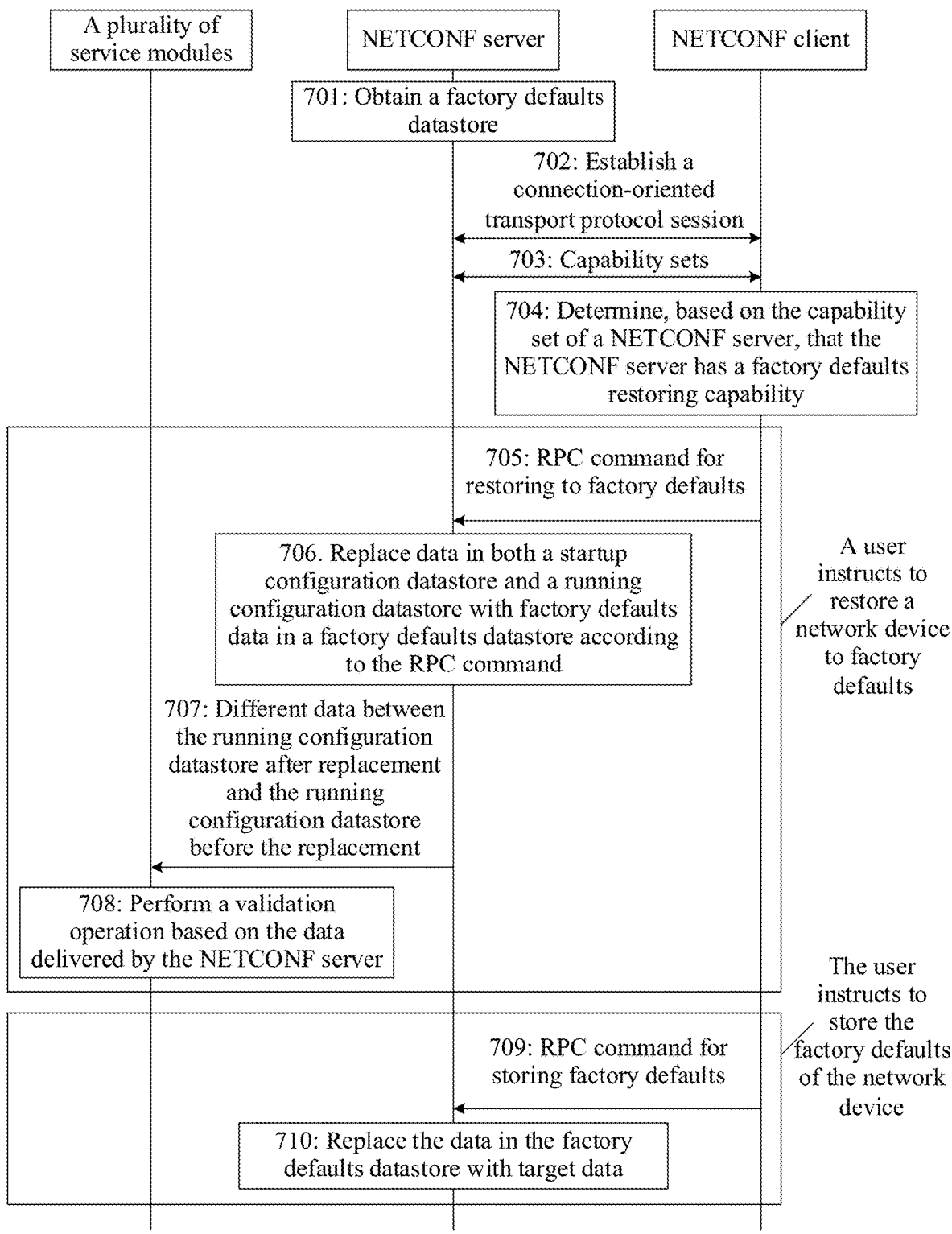
FIG. 7 is an interactive flowchart of a method for restoring a network device to factory defaults according to an embodiment of the present disclosure.

An embodiment of the present disclosure further provides a method for restoring a network device to factory defaults, used to illustrate the method shown in FIG. 5. Specifically, as shown in FIG. 7, the method specifically includes the following steps.

701: A NETCONF server obtains a factory defaults datastore.

Specifically, the NETCONF server may obtain the factory defaults datastore during a startup process of the network device, and specifically, may create a factory defaults datastore based on a startup program or directly call a stored created factory defaults datastore.

702: The NETCONF server establishes a connection-oriented transport protocol session with a NETCONF client.

A connection-oriented transport protocol between the NETCONF server and the NETCONF client may be the SSH, the TLS, the SOAP, the BEEP, or the like.

703: The NETCONF server and the NETCONF client exchange each other's capability sets.

In specific implementation, step 703 may include: sending, by the NETCONF server, the capability set of the NETCONF server to the NETCONF client, and receiving the capability set of the NETCONF client sent by the NETCONF client; and sending, by the NETCONF client, the capability set of the NETCONF client to the NETCONF server, and receiving, the capability set of the NETCONF server sent by the NETCONF server.

Specifically, the NETCONF describes, by using a capability, a protocol version and a function that are supported by the NETCONF server or the NETCONF client. The NETCONF server and the NETCONF client can exchange each other's capability sets by using Hello messages. The capability set of the NETCONF server (or NETCONF client) is used to describe the protocol version and the function that are supported by the NETCONF server (or the NETCONF client), for example, a Yang model version and a NETCONF version that are supported by the NETCONF server (or the NETCONF client).

The capability set of the NETCONF server includes a factory defaults restoring capability identifier of the NETCONF server, and the factory defaults restoring capability identifier is used to represent that the NETCONF server has a factory defaults restoring capability. For example, the factory defaults restoring capability identifier may be specifically: urn:ietf:params:netconf:capability:factory:1.0.

704: The NETCONF client determines, based on the capability set of the NETCONF server, that the NETCONF server has a factory defaults restoring capability.

Specifically, if the NETCONF client determines that the capability set of the NETCONF server includes the factory defaults restoring capability identifier, the NETCONF client determines that the NETCONF server has the factory defaults restoring capability.

After step 704, if a user instructs to restore the network device to the factory defaults, steps 705 to 708 are performed. If the user instructs to store the factory defaults of the network device, step 709 and step 710 are performed.

705: The NETCONF client delivers an RPC command for restoring to factory defaults to the NETCONF server according to an RPC command, for restoring to factory defaults, in a Yang model of the NETCONF.

Specifically, the RPC command for restoring to factory defaults is an RPC command added to a Yang model of the existing NETCONF. For example, a name of the RPC command for restoring to factory defaults may be <factory-restore>. In this case, the RPC command, for restoring to factory defaults, delivered by the NETCONF client to the NETCONF server may be specifically:

```
<rpc message-id="101"
    xmlns="urn:ietf:params:xml:ns:netconf:base:1.0">
  <factory-restore>
      <no-restart/>
  </ factory-restore >
</rpc>
``` where the first two lines of the four lines of code indicate that the command is an RPC command, <factory-restore/> is a name of the RPC command, <no-restart/> indicates that restoring to the factory defaults is performed without restarting, and </rpc> indicates that the command ends.

706: The NETCONF server receives the RPC command, for restoring to factory defaults, sent by the NETCONF client, and replaces data in both a startup configuration datastore and a running configuration datastore with factory defaults data in a factory defaults datastore according to the RPC command.

707: The NETCONF server delivers different data between the running configuration datastore after replacement and the running configuration datastore before the replacement to a plurality of service modules.

708: The plurality of service modules perform a validation operation based on the data delivered by the NETCONF server.

709: The NETCONF client delivers, to the NETCONF server according to an RPC command, for storing factory defaults, in the Yang model of the NETCONF, an RPC command for storing factory defaults.

The factory defaults storing command is used to update the factory defaults data of the network device.

Specifically, the RPC command for storing factory defaults is an RPC command added to the Yang model of the existing NETCONF. For example, a name of the RPC command for storing factory defaults may be <factory-store>. In this case, the RPC command, for storing factory defaults, delivered by the NETCONF client to the NETCONF server may be specifically:

```
<rpc message-id="101"
    xmlns="urn:ietf:params:xml:ns:netconf:base:1.0">
  <factory-store>
      <source>
          <running/>
      </source>
  </ factory-store >
</rpc>
``` where the first two lines of the eight lines of code indicate that the command is an RPC command, <factory-store> is a name of the RPC command, <source> indicates a source of data, <running/> indicates that the source of the data is the running configuration datastore, and the last three lines of code indicate that the command ends. According to the RPC command, the data is to be added to the factory defaults datastore by default. This command is used to instruct the NETCONF server to replace the data in the factory defaults datastore with the data in the running configuration datastore. A<source> field indicates that parameters that may be received, in addition to <running>, may further include <startup>, <config>, and <url>, where <config> refers to specific data, and <url> is used to indicate a file on a specified path.

710: The NETCONF server receives the RPC command, for storing factory defaults, sent by the NETCONF client, and replaces the data in the factory defaults datastore with target data.

The target data may be preset data, data in a preset configuration datastore, or data in a preset file. In the example of step 709, the target data is the data in the running configuration datastore.

Figure 8:
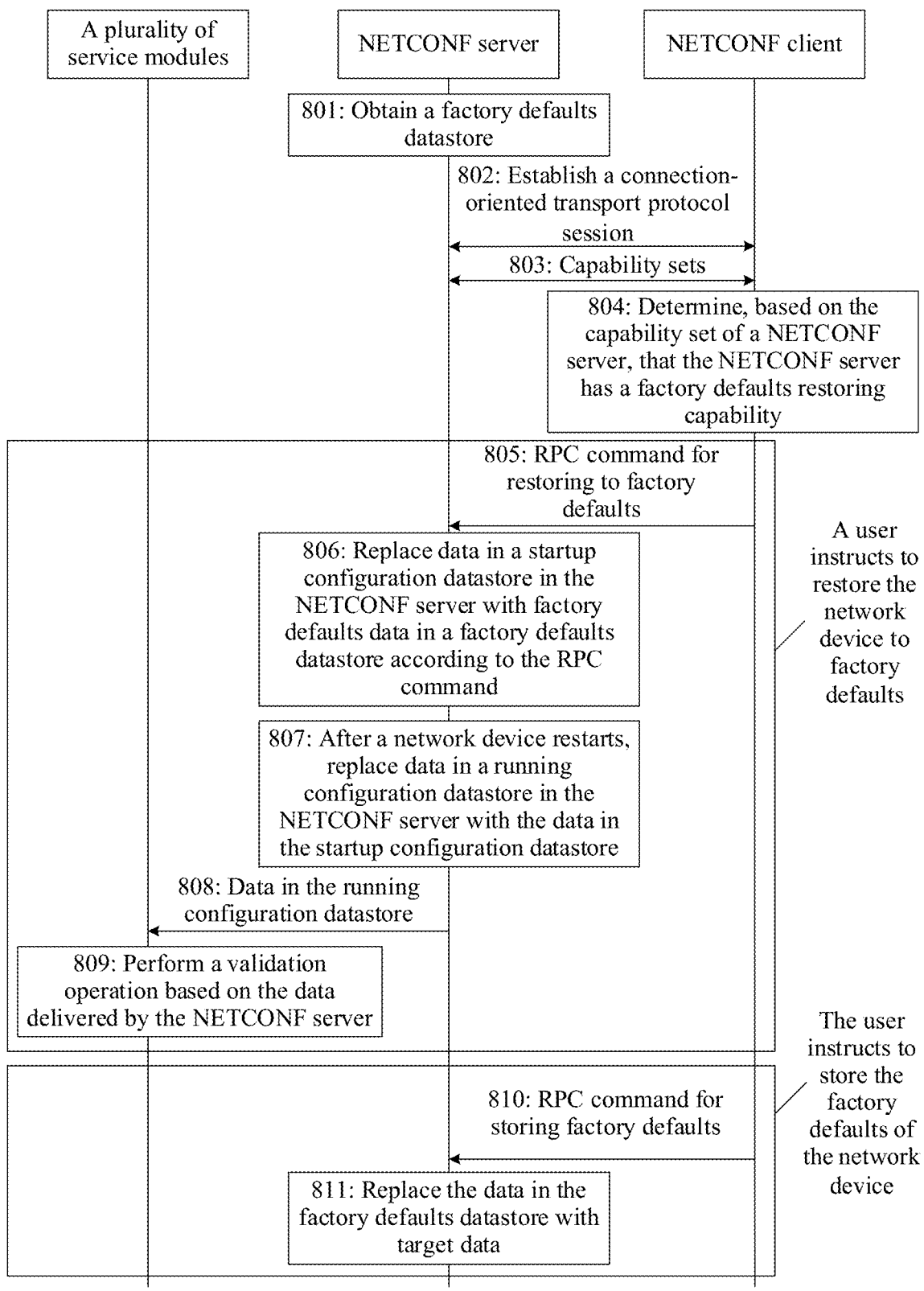
FIG. 8 is an interactive flowchart of another method for restoring a network device to factory defaults according to an embodiment of the present disclosure.

An embodiment of the present disclosure further provides a method for restoring a network device to factory defaults, used to illustrate the method shown in FIG. 6. Specifically, as shown in FIG. 8, the method specifically includes the following steps.

801 to 804: Steps 801 to 804 are the same as step 701 to step 704 in FIG. 7, respectively. For specific content, refer to the embodiment in FIG. 7. For explanations of other content, in this embodiment, related to the foregoing embodiments, refer to the foregoing embodiments.

After step 804, if a user instructs to restore the network device to the factory defaults, steps 805 to 809 are performed. If the user instructs to store the factory defaults of the network device, step 810 and step 811 are performed.

805: The NETCONF client delivers an RPC command for restoring to factory defaults to the NETCONF server according to an RPC command, for restoring to factory defaults, in a Yang model of the NETCONF.

Specifically, the RPC command for restoring to factory defaults is an RPC command added to a Yang model of an existing NETCONF. For example, a name of the RPC command for restoring to factory defaults may be <factory-restore>. In this case, the RPC command, for restoring to factory defaults, delivered by the NETCONF client to the NETCONF server may be specifically:

```
<rpc message-id="101"
    xmlns="urn:ietf:params:xml:ns:netconf:base:1.0">
<factory-restore/>
</rpc>
or
<rpc message-id="101"
xmlns="urn:ietf:params:xml:ns:netconf:base:1.0">
<factory-restore>
    <restart/>
</ factory-restore >
</rpc>
``` where the first two lines of the four lines of code indicate that the command is an RPC command, <factory-restore/> is a name of the RPC command, and <restart/> indicates that restoring to the factory defaults is performed by restarting (if no<restart/> exists, the factory defaults is restored by restarting by default), and </rpc> indicates that the command ends.

806: The NETCONF server receives the RPC command, for restoring to factory defaults, sent by the NETCONF client, and replaces data in a startup configuration datastore in the NETCONF server with factory defaults data in a factory defaults datastore according to the RPC command.

807: After the network device restarts, the NETCONF server replaces data in a running configuration datastore in the NETCONF server with the data in the startup configuration datastore.

808: The NETCONF server delivers the data in the running configuration datastore to a plurality of service modules.

It should be noted that the network device includes the plurality of service modules such as an interface module, a DHCP module, and a WLAN module. Different service modules are used for processing different data. Therefore, during data delivery, the NETCONF server delivers, to a different service module, data to be processed by the service module.

809: The plurality of service modules perform a validation operation based on the data delivered by the NETCONF server.

810-811: Step 810 is the same as step 709, and step 811 is the same as step 710. For specific content, refer to the embodiment based on FIG. 7.

In addition, in the method shown in FIG. 4, steps 701 to 704 may also be included before step 401. Details are not described herein again.

According to the method provided in this embodiment of the present disclosure, the factory defaults datastore is dedicated to storing the factory defaults data of the network device. This avoids that each service module stores its factory defaults data. The NETCONF server itself can restore the network device to the factory defaults, and therefore each service module does not need to register its factory defaults processing function. This is beneficial to third-party extension. In addition, the NETCONF client does not need to deliver the command for restoring to factory defaults to each service module in the network device by using the NETCONF server. This is convenient for maintenance. In addition, in the prior art, a command for restoring to factory defaults needs to be delivered to each service module in a network device, and therefore an RPC command for restoring to factory defaults further needs to be added to a Yang model of each service module. This is disadvantageous to inheritance and extensibility of the Yang model. In this embodiment of the present disclosure, there is no need to add the command for restoring to factory defaults to each service module in the network device, and therefore there is no need to add the RPC command for restoring to factory defaults to a Yang model of each service module. This is beneficial to inheritance and extensibility of the Yang model.

Figure 9:
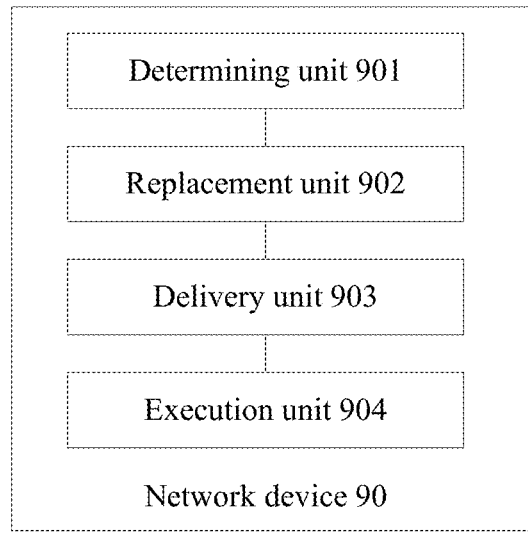
FIG. 9 is a schematic diagram of composition of a network device according to an embodiment of the present disclosure.

An embodiment of the present disclosure further provides a network device 90. As shown in FIG. 9, the network device 90 includes:

a determining unit 901, configured to determine that the network device 90 needs to be restored to factory defaults;

a replacement unit 902, configured to replace data in a startup configuration datastore and a running configuration datastore in the network device 90 with factory defaults data in a factory defaults datastore, where the factory defaults datastore is dedicated to storing the factory defaults data of the network device 90;

a delivery unit 903, configured to deliver the data in the running configuration datastore after replacement to an execution unit 904; and the execution unit 904, configured to perform a validation operation based on the data delivered by the delivery unit 903.

Optionally, the determining unit 901 is specifically configured to:

when the determining unit 901 determines that the network device 90 starts for the first time or determines that a command, for restoring to factory defaults, sent by a NETCONF client is received, determine that the network device 90 needs to be restored to the factory defaults.

Optionally, when the network device 90 starts for the first time, the replacement unit 902 is specifically configured to:

replace the data in the startup configuration datastore with the factory defaults data; and replace the data in the running configuration datastore with the data in the startup configuration datastore.

Optionally, when the determining unit 901 determines that the command, for restoring to factory defaults, sent by the NETCONF client is received, the replacement unit 902 is specifically configured to:

replace the data in the startup configuration datastore with the factory defaults data; and after the network device 90 restarts, replace the data in the running configuration datastore with the data in the startup configuration datastore.

Optionally, when the determining unit 901 determines that the command, for restoring to factory defaults, sent by the NETCONF client is received, the replacement unit 902 is specifically configured to replace the data in both the startup configuration datastore and the running configuration datastore with the factory defaults data in the factory defaults datastore; and the delivery unit 903 is specifically configured to deliver different data between the running configuration datastore after replacement and the running configuration datastore before the replacement to the execution unit 904.

Figure 10:
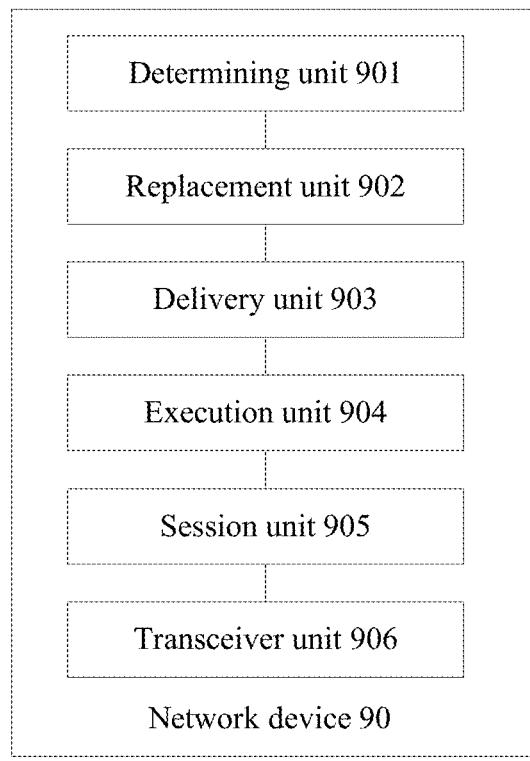
FIG. 10 is a schematic diagram of composition of another network device according to an embodiment of the present disclosure.

Optionally, as shown in FIG. 10, the network device 90 further includes:

a session unit 905, configured to establish a connection-oriented transport protocol session between the network device 90 and the NETCONF client; and a transceiver unit 906, configured to send a capability set of the network device 90 to the NETCONF client, and receive a capability set of the NETCONF client sent by the NETCONF client, where the capability set of the network device 90 includes a factory defaults restoring capability identifier of the network device 90, and the factory defaults restoring capability identifier is used to indicate that the network device 90 has the factory defaults restoring capability.

Optionally, the transceiver unit 906 is further configured to receive a factory defaults storing command sent by the NETCONF client.

The replacement unit 902 is further configured to replace the data in the factory defaults datastore with target data, where the target data is preset data, data in a preset configuration datastore, or data in a preset file.

Optionally, the command for restoring to factory defaults is a remote procedure call RPC command that is added to a Yang model of the NETCONF and that is used to restore the network device to the factory defaults, and the factory defaults storing command is an RPC command that is added to the Yang model of the NETCONF and that is used to store the factory defaults of the network device.

The units in the network device 90 provided in this embodiment of the present disclosure are configured to perform the foregoing methods. Therefore, for beneficial effects of the network device 90, refer to the beneficial effects described in the foregoing method sections. Details are not described herein again.

Figure 11:
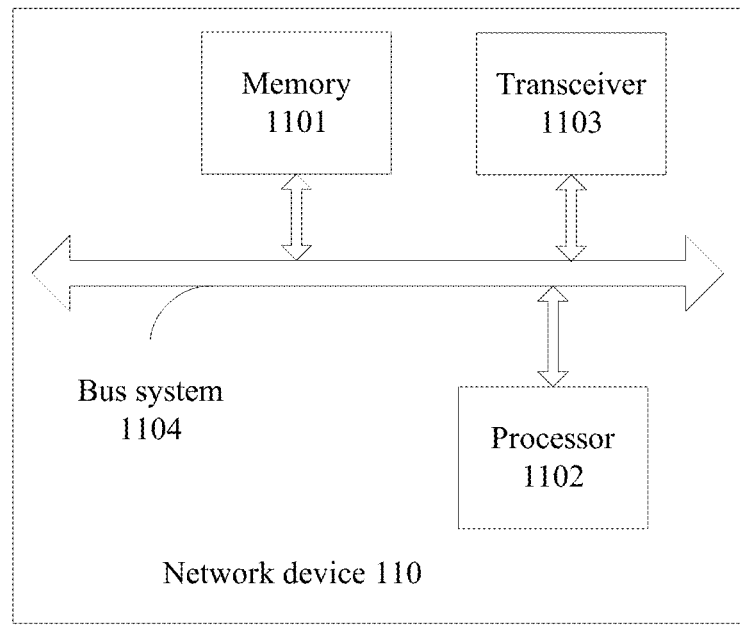
FIG. 11 is a schematic diagram of composition of another network device according to an embodiment of the present disclosure.

An embodiment of the present disclosure further provides a network device 110. As shown in FIG. 11, the network device 110 includes a memory 1101, a processor 1102, and a transceiver 1103. The memory 1101 is configured to store a set of code. The processor 1102 is configured to perform, based on the set of code, any of the methods shown in FIG. 3 to FIG. 6. The processor is further configured to perform step 701 and step 702, steps 706 to 708, and step 710 in the method shown in FIG. 7. The processor is further configured to perform step 801 and step 802, steps 806 to 809, and step 811 in the method shown in FIG. 8. The transceiver 1103 is configured to perform step 703, step 706, and step 710 in the method shown in FIG. 7, and is further configured to perform step 803, step 806, and step 811 in the method shown in FIG. 8.

The memory 1101, the processor 1102, and the transceiver 1103 are coupled together by using a bus system 1104. The memory 1101 may include a random access memory, or may further include a non-volatile memory such as at least one magnetic disk storage. The bus system 1104 may be an Industry Standard Architecture (ISA) bus, a Peripheral Component Interconnect (PCI) bus, an Extended Industry Standard Architecture (EISA) bus, or the like. The bus system 1104 may be classified into an address bus, a data bus, a control bus, and the like. For ease of representation, the bus is represented by using only one thick line in FIG. 11, but it does not mean that there is only one bus or one type of bus.

In FIG. 9 and FIG. 10, the transceiver unit 906 may be the transceiver 1103, and the remaining units may be the processor 1102. The remaining units may be embedded in or independent of the processor of the network device in a hardware form, or may be stored in the memory of the network device in a software form, to be invoked by the processor for performing the operations corresponding to the foregoing units. The processor may be a central processing unit (CPU), or an application-specific integrated circuit (ASIC), or one or more integrated circuits configured to implement this embodiment of the present disclosure.

The components in the network device 110 provided in this embodiment of the present disclosure are configured to perform the foregoing methods. Therefore, for beneficial effects of the network device 110, refer to the beneficial effects described in the foregoing method sections. Details are not described herein again.

Figure 12:
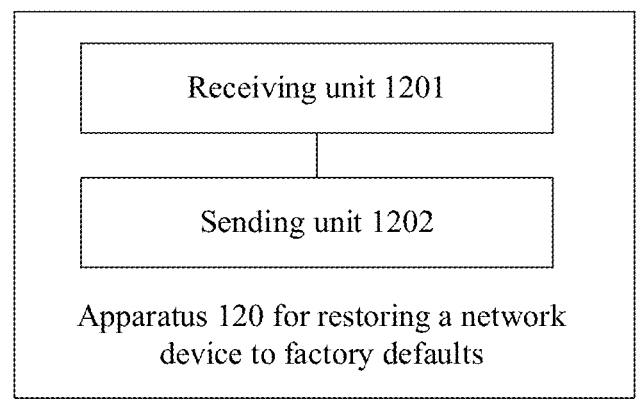
FIG. 12 is a schematic diagram of composition of an apparatus for restoring a network device to factory defaults according to an embodiment of the present disclosure.

An embodiment of the present disclosure further provides an apparatus 120 for restoring a network device to factory defaults. As shown in FIG. 12, the apparatus 120 includes:

a receiving unit 1201, configured to receive an instruction from a user for restoring the network device to the factory defaults; and a sending unit 1202, configured to send a command for restoring to factory defaults to the network device according to a remote procedure call RPC command added to a Yang model of theNETCONF, so that the network device replaces data in a startup configuration datastore and a running configuration datastore in the network device with factory defaults data in a factory defaults datastore, and performs a validation operation based on the data in the running configuration datastore, where the factory defaults datastore is dedicated to storing the factory defaults data of the network device.

Figure 13:
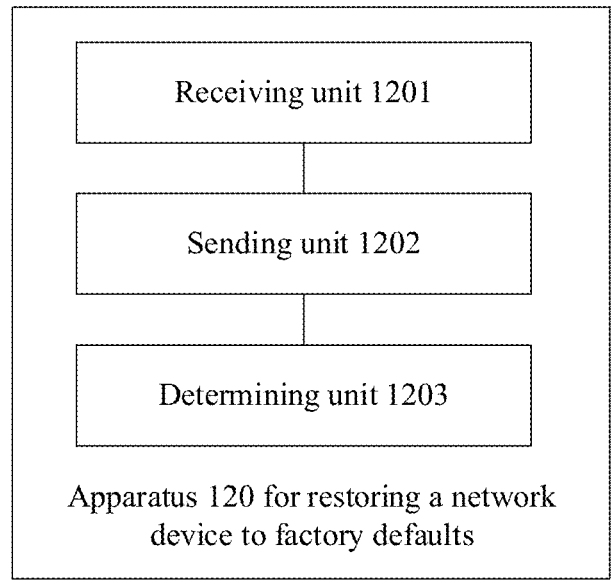
FIG. 13 is a schematic diagram of composition of another apparatus for restoring a network device to factory defaults according to an embodiment of the present disclosure.

Optionally, as shown in FIG. 13, the apparatus 120 further includes: a determining unit 1203, configured to determine that the network device has a factory defaults restoring capability.

Optionally, the receiving unit 1201 is further configured to receive a capability set of the network device sent by the network device, and the sending unit 1202 is further configured to send a capability set of the apparatus 120 to the network device, where the capability set of the network device includes a factory defaults restoring capability identifier of the network device, and the factory defaults restoring capability identifier is used to indicate that the network device has the factory defaults restoring capability. The determining unit 1203 is specifically configured to determine, based on the factory defaults restoring capability identifier in the capability set of the network device, that the network device has the factory defaults restoring capability.

Optionally, the receiving unit 1201 is further configured to receive an instruction from the user for storing the factory defaults of the network device.

The sending unit 1202 is further configured to send a factory defaults storing command to the network device according to an RPC command that is added to the Yang model of the NETCONF and that is used to store the factory defaults of the network device, so that the network device replaces the data in the factory defaults datastore with target data, where the target data is preset data, data in a preset configuration datastore, or data in a preset file.

The units in the apparatus 120 provided in this embodiment of the present disclosure are configured to perform the foregoing methods. Therefore, for beneficial effects of the apparatus 120, refer to the beneficial effects described in the foregoing method sections. Details are not described herein again.

Figure 14:
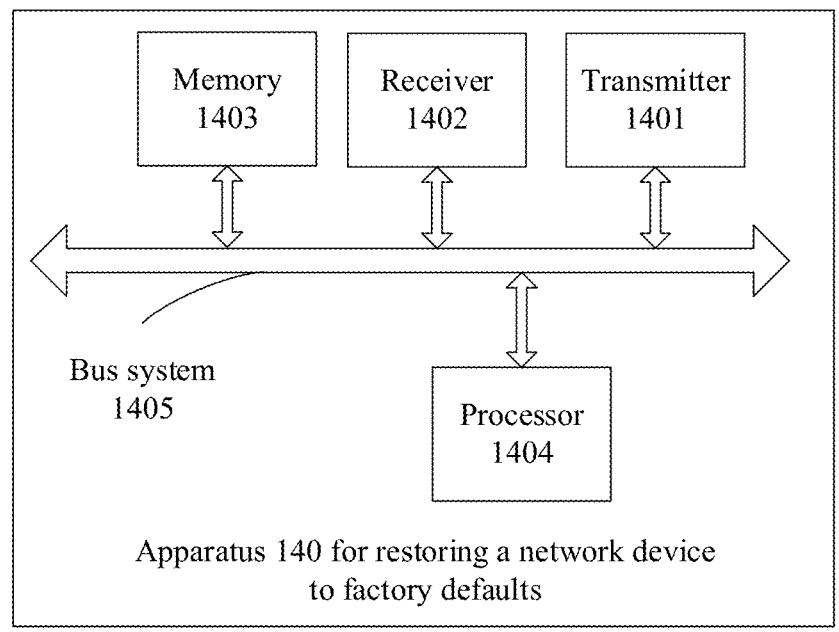
FIG. 14 is a schematic diagram of composition of another apparatus for restoring a network device to factory defaults according to an embodiment of the present disclosure.

An embodiment of the present disclosure further provides an apparatus 140 for restoring a network device to factory defaults. As shown in FIG. 14, the apparatus 140 includes a transmitter 1401, a receiver 1402, a memory 1403, and a processor 1404. The processor 1404 is configured to perform corresponding actions based on code stored in the memory 1403.

The transmitter 1401, the receiver 1402, the memory 1403, and the processor 1404 are coupled together by using a bus system 1405. The memory 1403 may include a random access memory, or may further include a non-volatile memory such as at least one magnetic disk storage. The bus system 1405 may be an ISA bus, a PCI bus, an EISA bus, or the like. The bus system 1405 may be classified into an address bus, a data bus, a control bus, and the like. For ease of representation, the bus is represented by using only one thick line in FIG. 14, but it does not mean that there is only one bus or one type of bus.

Specifically, the processor 1404 is configured to perform, by using the transmitter 1401, step 703, step 705, and step 709 in the method shown in FIG. 7 and step 803, step 805, and step 810 in the method shown in FIG. 8. The processor 1404 is further configured to perform steps 702 to 704 in the method shown in FIG. 7 and steps 802 to 804 in the method shown in FIG. 8.

In FIG. 12 and FIG. 13, the receiving unit 1201 may be the receiver 1402, the sending unit 1202 may be the transmitter 1401, and the determining unit 1203 may be the processor 1404. The determining unit may be embedded in or independent of the processor of the apparatus for restoring a network device to factory defaults, in a hardware form, or may be stored, in a software form, in the memory of the apparatus for restoring a network device to factory defaults, to be invoked by the processor for performing the operations corresponding to the foregoing units. The processor may be a CPU or an ASIC, or may be configured as one or more integrated circuits implementing this embodiment of the present disclosure.

The components in the apparatus 140 provided in this embodiment of the present disclosure are configured to perform the foregoing methods. Therefore, for beneficial effects of the apparatus 140, refer to the beneficial effects described in the foregoing method sections. Details are not described herein again.

In the several embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or may not be performed.

The modules described as separate parts may or may not be physically separate, and parts displayed as modules may or may not be physical modules, may be located in one position, or may be distributed on a plurality of network units. Some or all of the units may be selected according to actual requirements to achieve the objectives of the solutions of the embodiments.

In addition, functional modules in the embodiments of the present disclosure may be integrated into one processing module, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

What is claimed is:

1. A method for restoring a network device to factory defaults, wherein the network device comprises a Network Configuration Protocol (NETCONF) server and a plurality of service modules, the NETCONF server comprising a startup configuration datastore, a running configuration datastore, and a factory defaults datastore, the method comprising:
   determining, by the NETCONF server, that the network device needs to be restored to the factory defaults based upon receiving a command for restoring to factory defaults sent by a NETCONF client, wherein the command for restoring to factory defaults is a remote procedure call (RPC) command that is added to a Yang model of the NETCONF for restoring the network device to the factory defaults;
   replacing, by the NETCONF server, data in the startup configuration datastore and the running configuration datastore in the NETCONF server with factory defaults data in the factory defaults datastore, wherein the factory defaults datastore is dedicated to storing the factory defaults data of the network device;
   delivering, by the NETCONF server, the data in the running configuration datastore after replacement to the plurality of service modules; and
   performing, by the plurality of service modules, a validation operation based on the data delivered by the NETCONF server.

2. The method according to claim 1, wherein determining, by the NETCONF server, that the network device needs to be restored to the factory defaults comprises:
   when the NETCONF server determines that the network device starts for the first time, determining, by the NETCONF server, that the network device needs to be restored to the factory defaults.

3. The method according to claim 2, wherein when the network device starts for the first time, replacing, by the NETCONF server, data in the startup configuration datastore and the running configuration datastore in the NETCONF server with factory defaults data in the factory defaults datastore comprises:
   replacing, by the NETCONF server, the data in the startup configuration datastore with the factory defaults data; and
   replacing, by the NETCONF server, the data in the running configuration datastore with the data in the startup configuration datastore after replacement.

4. The method according to claim 2, wherein when the NETCONF server receives the command for restoring to factory defaults sent by the NETCONF client, replacing, by the NETCONF server, data in the startup configuration datastore and the running configuration datastore in the NETCONF server with factory defaults data in the factory defaults datastore comprises:
  replacing, by the NETCONF server, the data in the startup configuration datastore with the factory defaults data; and
  after the network device restarts, replacing, by the NETCONF server, the data in the running configuration datastore with the data in the startup configuration datastore after replacement.

5. The method according to claim 2, wherein:
when the NETCONF server receives the command for restoring to factory defaults sent by the NETCONF client:
  replacing, by the NETCONF server, data in the startup configuration datastore and the running configuration datastore in the NETCONF server with factory defaults data in the factory defaults datastore comprises:
    replacing, by the NETCONF server, the data in both the startup configuration datastore and the running configuration datastore in the NETCONF server with the factory defaults data in the factory defaults datastore; and
  delivering, by the NETCONF server, the data in the running configuration datastore after replacement to the plurality of service modules comprises:
    delivering, by the NETCONF server, different data between the running configuration datastore after replacement and the running configuration datastore before the replacement to the plurality of service modules.

6. The method according to claim 1, further comprising:
establishing, by the NETCONF server, a connection-oriented transport protocol session with the NETCONF client; and
sending, by the NETCONF server, a capability set of the NETCONF server to the NETCONF client, and receiving a capability set of the NETCONF client sent by the NETCONF client, wherein the capability set of the NETCONF server comprises a factory defaults restoring capability identifier of the NETCONF server for indicating that the NETCONF server has the factory defaults restoring capability.

7. The method according to claim 1, further comprising:
receiving, by the NETCONF server, a factory defaults storing command sent by the NETCONF client; and
replacing, by the NETCONF server, the data in the factory defaults datastore with target data, wherein the target data is preset data, data in a preset configuration datastore, or data in a preset file.

8. The method according to claim 7, wherein the factory defaults storing command is an RPC command that is added to the Yang model of the NETCONF for storing the factory defaults of the network device.

9. A network device, wherein the network device comprises a Network Configuration Protocol (NETCONF) server and a plurality of service modules, the NETCONF server comprising a startup configuration datastore, a running configuration datastore, and a factory defaults datastore, the network device comprising:
  a processor; and
  memory coupled to the processor, the memory comprising instructions that, when executed by the processor, cause the network device to:
    determine that the network device needs to be restored to factory defaults based upon receiving a command for restoring to factory defaults sent by a NETCONF client, wherein the command for restoring to factory defaults is a remote procedure call (RPC) command that is added to a Yang model of the NETCONF for restoring the network device to the factory defaults,
    replace data in the startup configuration datastore and the running configuration datastore in the network device with factory defaults data in the factory defaults datastore, wherein the factory defaults datastore is dedicated to storing the factory defaults data of the network device,
    deliver the data in the running configuration datastore after replacement to an execution unit, and
    perform a validation operation based on the data delivered by the delivery unit.

10. The network device according to claim 9, wherein the instructions, when executed by the processor, cause the network device to:
  when determining that the network device starts for the first time
  , determine that the network device needs to be restored to the factory defaults.

11. The network device according to claim 10, wherein the instructions, when executed by the processor, cause the network device to:
  when the network device starts for the first time:
    replace the data in the startup configuration datastore with the factory defaults data, and
    replace the data in the running configuration datastore with the data in the startup configuration datastore after replacement.

12. The network device according to claim 10, wherein the instructions, when executed by the processor, cause the network device to:
  when determining that the command for restoring to factory defaults sent by the NETCONF client is received:
    replace the data in the startup configuration datastore with the factory defaults data; and
    after the network device restarts, replace the data in the running configuration datastore with the data in the startup configuration datastore after replacement.

13. The network device according to claim 10, wherein the instructions, when executed by the processor, cause the network device to:
  when determining that the command for restoring to factory defaults sent by the NETCONF client is received:
    replace the data in both the startup configuration datastore and the running configuration datastore with the factory defaults data in the factory defaults datastore, and
    deliver different data between the running configuration datastore after replacement and the running configuration datastore before the replacement to the execution unit.

14. The network device according to claim 9, wherein the instructions, when executed by the processor, cause the network device to:
  establish a connection-oriented transport protocol session between the network device and the NETCONF client; and
  send a capability set of the network device to the NETCONF client, and receive a capability set of the NETCONF client sent by the NETCONF client, wherein the capability set of the network device comprises a factory defaults restoring capability identifier of the network device for indicating that the network device has the factory defaults restoring capability.

* * * * *